ically tuned buffer rod and connected to a piezoelectric
United States Patent
Taplin

[11] 3,999,433
[45] Dec. 28, 1976

[54] MECHANICALLY TUNED BUFFER ROD FOR ULTRASONIC TEMPERATURE SENSOR

[75] Inventor: Lael B. Taplin, Royal Oak, Mich.

[73] Assignee: The United States of America as represented by the Secretary of the Air Force, Washington, D.C.

[22] Filed: Oct. 23, 1974

[21] Appl. No.: 517,340

[52] U.S. Cl. .............................. 73/339 A; 310/8.2
[51] Int. Cl.² ...................................... G01K 11/22
[58] Field of Search ................... 73/67.6, 339 A; 310/8.2

[56] References Cited

UNITED STATES PATENTS

| | | | |
|---|---|---|---|
| 2,998,723 | 9/1961 | Smith et al. | 73/290 V |
| 3,111,595 | 11/1963 | Junger | 310/8.2 |
| 3,142,034 | 7/1964 | Junger | 310/8.3 X |
| 3,214,976 | 11/1965 | Miller | 73/339 A |
| 3,501,956 | 3/1970 | Yamaga et al. | 73/339 A |
| 3,534,609 | 10/1970 | Grenfell et al. | 73/339 A |
| 3,540,265 | 11/1970 | Lynnworth | 73/339 A X |
| 3,696,259 | 10/1972 | Mori et al. | 310/8.2 X |

FOREIGN PATENTS OR APPLICATIONS 598,176  2/1948  United Kingdom ............. 73/339 A

*Primary Examiner*—Richard C. Queisser
*Assistant Examiner*—Frederick Shoon
*Attorney, Agent, or Firm*—Joseph E. Rusz; Henry S. Miller

[57] ABSTRACT

A buffer rod for transmitting and receiving ultrasonic waves in a high-temperature gas medium including a plurality of flat discs center coupled along a mechanically tuned buffer rod and connected to a piezoelectric or magnetostrictive element to convert disc vibrations into electrical signals.

1 Claim, 1 Drawing Figure

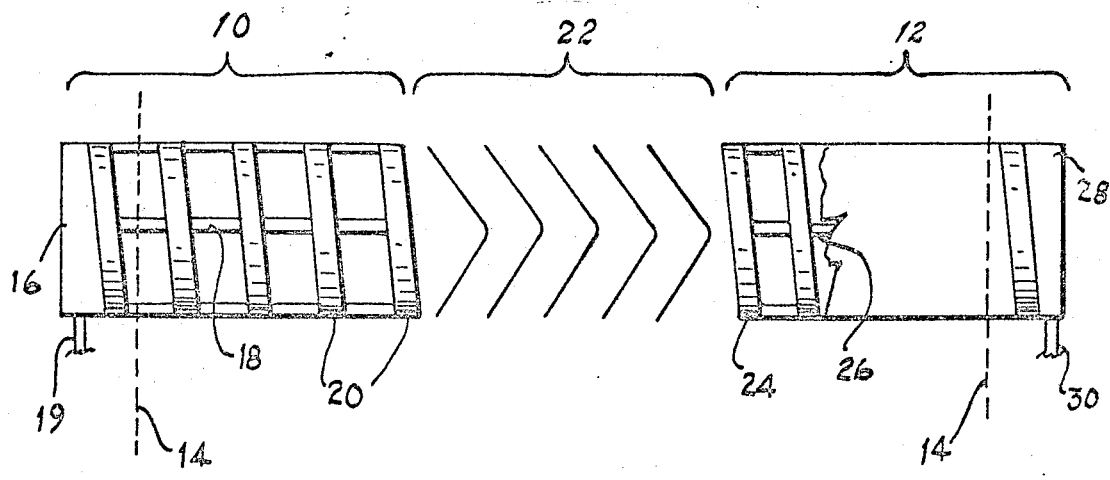

MECHANICALLY TUNED BUFFER ROD FOR ULTRASONIC TEMPERATURE SENSOR

STATEMENT OF GOVERNMENT INTEREST

The invention described herein may be manufactured and used by or for the Government for governmental purposes without the payment of any royalty thereon.

BACKGROUND OF THE INVENTION

This invention relates generally to temperature sensing elements and more particularly to a sensing element adaptable for use with high-temperature gases.

The increased use of high temperature gases whether from rocket motors or in plasma applications has created the need for improved devices to monitor temperature variations. Two areas of concern immediately arise with this criterion, first a device that will provide accurate information and secondly a device that will shield necessary electronic components from the excessive heat to which it is necessarily exposed.

Accurate information requires the exclusion of possible interference between the hot gas and the readout unit. While much interference may be eliminated by electronic means located between the sensor and the readout, an improved system would protect the detectable data at the sensor.

While solid state electronic components are more adaptable to high temperatures than tube type devices, there is little that can effectively shield electronic components placed in, or attached to a device, in a plasma stream.

The most effective means is to remove the electronics to the greatest extent possible from the area of extreme heat.

SUMMARY OF THE INVENTION

The invention advances the state of the art by providing a temperature sensor having a high degree of accuracy while protecting support equipment from extreme temperatures.

It is well known in the art that sound waves are affected by variations in temperature. It is also understood that by using sonic techniques temperatures may be measured. The instant invention involves a means for radiating ultrasonic waves within a narrow frequency band into a gaseous medium, and further means for detecting the waves.

A mechanically tuned buffer rod consisting of a plurality of discs and rods, is formed of a material having poor heat transfer characteristics.

The sections of the sensor provide highly tuned high "Q" sections allowing for maximum displacement of the acoustic ends to maximize the acoustic power being transmitted or received. In the transmitting mode, experience has shown no practical means or method for obtaining a quality impedance match between a refractory material bar and a gaseous medium, hence to compensate, substantial amounts of power are radiated from a given area of the rod. Such radiation is created by high amplitude motion at the rod-gas interface.

The nature of the arrangement of parts creates, in effect, a highly selective band pass filter thereby attenuating substantially exteraneous noise outside the band pass region.

The buffer rods both transmitting and receiving extend beyond the container of the high temperature gas where piezoelectric or magnetostrictive elements convert the vibrations electrical energy which is then interpreted as a function of temperature.

It is therefore an object of the invention to provide a new and improved temperature sensor.

It is another object of the invention to provide a new and improved ultrasonic temperature sensor.

It is a further object of the invention to provide a new and improved ultrasonic temperature sensor adapted for high temperature gaseous mediums.

It is still another object of the invention to provide a new and improved ultrasonic temperature sensor that is more accurate than any hitherto known.

It is still a further object of the invention to provide a new and improved ultrasonic temperature sensor that allows heat sensitive to be positioned in an operatively acceptable environment.

It is another object of the invention to provide a new and improved ultrasonic temperature sensor that rejects error signals.

It is another object of the invention to provide a new and improved ultrasonic temperature sensor having high Q characteristics.

It is another object of the invention to provide a new and improved mechanical ultrasonic temperature sensor that readily mates with existing electronic equipment.

These and other advantages, features and objects of the invention will become more apparent from the following description taken in connection with the illustrative embodiment in the accompanying drawing.

DESCRIPTION OF THE DRAWING

The FIGURE is a schematic representation of the invention.

DESCRIPTION OF THE PREFERRED EMBODIMENT

Referring now to the FIGURE the temperature sensor comprises a transmitting section 10 and a receiving section 12. Walls of the vessel containing the high temperature gaseous medium are represented by the lines 14. An appropriate transducer 16 is positioned at the external end of the buffer rod 18 and is connected to a frequency source via lines 19 to cause the rod to vibrate at a desired frequency along with the discs 20. The vibrating rod and discs, having high Q characteristics emits an acoustic wave 22 through the high temperature gaseous medium. The sensing section 12 receives the acoustic waves as modified by the temperature of the gas and because of its high Q characteristics reacts through its discs 24 and buffer rod 26 by vibrating and hence generating an electrical signal in the piezoelectrical or magnetostrictive element 28, located outside the vessel 14. The current generated is fed via lines 30 to appropriate measuring and recording equipment.

The nature of the high Q tuned buffer rod allows signals in a narrow frequency band to be transmitted and received thereby excluding extraneous signals that might be generated within the vessel leading to errors in the output of the system.

The buffer rod is assembled in sections and constructed of materials offering a poor heat conduction path from the hot gas to the sending and receiving elements.

Although the invention has been described with reference to a particular embodiment, it will be understood to those skilled in the art that the invention is capable of a variety of alternative embodiments within the spirit and scope of the appended claims.

I claim:

1. Ultrasonic temperature sensor for a gaseous medium comprising: a first buffer rod means in the gaseous medium; a plurality of discs positioned along said first rod in a spaced relation and selected to move therewith; transducer means connected to one end of said first rod for causing the rod to vibrate; a second buffer rod means in the gaseous medium; a plurality of discs positioned along said second rod in spaced relation and selected to move therewith; means connected to one end of said second rod to create an electrical signal upon vibration of said second rod, said first and second rods form a mechanical filter of highly tuned Q sections, whereby when said first rod vibrates in the gaseous medium, it will cause said second rod located in said medium to vibrate at a frequency indicative of the temperature of the gaseous medium.

* * * * *